Dec. 1, 1925.

P. A. McGEE

CATENARY SYSTEM

Filed Jan. 7, 1922

WITNESSES:

INVENTOR
Patrick A. McGee.
BY
ATTORNEY

Dec. 1, 1925.

P. A. McGEE

CATENARY SYSTEM

Filed Jan. 7, 1922

WITNESSES:

INVENTOR
Patrick A. McGee.
BY
ATTORNEY

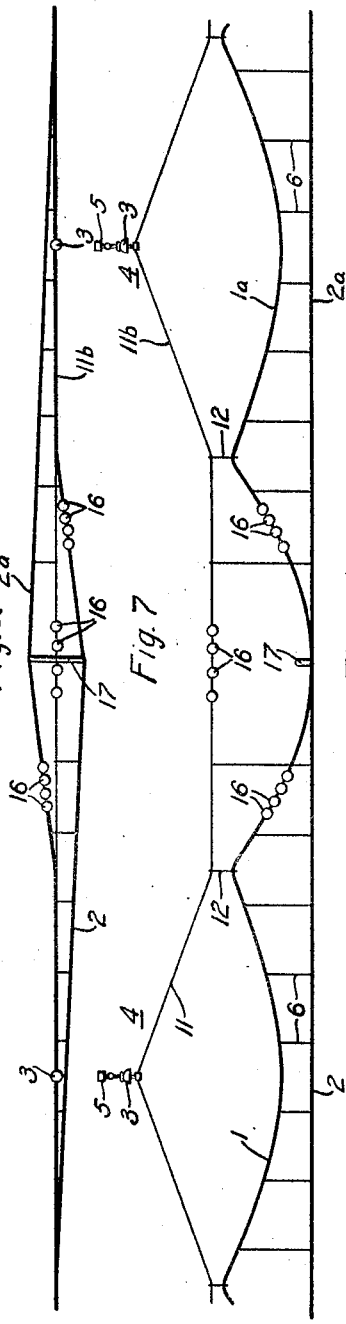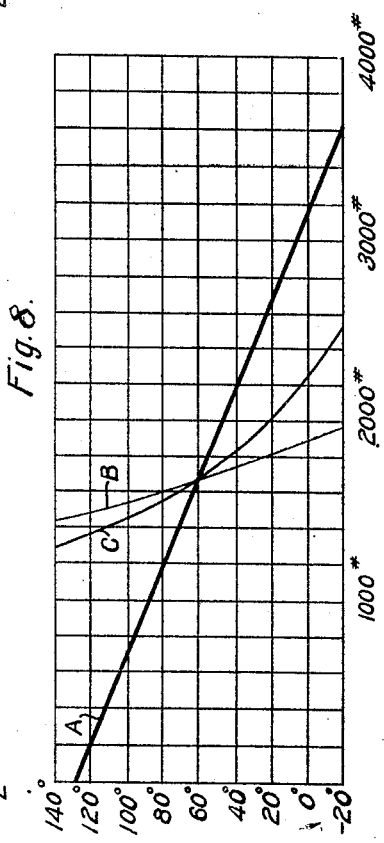

Patented Dec. 1, 1925.

1,563,386

UNITED STATES PATENT OFFICE.

PATRICK A. McGEE, OF WILKINSBURG, PENNSYLVANIA, ASSIGNOR TO WESTINGHOUSE ELECTRIC & MANUFACTURING COMPANY, A CORPORATION OF PENNSYLVANIA.

CATENARY SYSTEM.

Application filed January 7, 1922. Serial No. 527,593.

*To all whom it may concern:*

Be it known that I, PATRICK A. McGEE, a subject of the King of Great Britain, and a resident of Wilkinsburg, in the county of Allegheny and State of Pennsylvania, have invented a new and useful Improvement in Catenary Systems, of which the following is a specification.

My invention relates to overhead trolley systems and it has particular relation to systems of the catenary type.

One object of my invention is to provide a system of construction for an overhead trolley system that will reduce the variation in stress in the contact wire thereof, caused by temperature changes, wind pressure, ice and the like, to a minimum value.

Another object of my invention is to provide an improved section-insulation means for an overhead trolley system.

Still another object of my invention is to provide a system in which the messenger cable and the trolley conductors are interchangeable to secure maximum wear for the trolley wires before it is necessary to have them replaced.

A further object of my invention is to provide an overhead trolley system that shall present a smooth, underrunning surface at all times for a contact device by which it may be engaged.

Another object of my invention is to provide means for frequently anchoring the contact wire or trolley conductor of a relatively simple catenary system to the structures that are employed to support the system.

A further object of my invention is to provide a self-anchoring catenary system, which is so constructed as to provide means for maintaining the stresses in the remaining wires within allowable working values upon the failure of either a contact wire or a messenger cable.

Still another object of my invention is to provide an overhead trolley system which is simple and economical of construction and rugged and efficient in operation.

Briefly speaking, my invention, in its simplest form, comprises two interconnected overhead trolley conductors which may be alternately engaged by the same contact device, whereby each conductor alternately serves as a messenger cable for the other.

It is to be understood that the invention is applicable where more than one trolley conductor, or contact wire, are employed for simultaneously conducting energy to either one or more contact devices.

For a better understanding of my invention, reference may be made to the accompanying drawings, Figure 1 of which is a view, in side elevation, of an overhead trolley system constructed in accordance with my invention;

Figs. 2 and 3, inclusive, are views, in side elevation, of modified forms of trolley systems embodying my invention;

Figs. 6 and 7 are views, in plan and in side elevation, respectively, of a trolley system constructed in accordance with my invention and provided with section breaks;

Fig. 8 is a chart showing the relation of changes in temperature to the load upon a trolley conductor and a messenger-cable catenary system constructed in accordance with the usual practice, as compared with a trolley conductor suspended in a trolley system constructed in accordance with my invention; and Fig. 9 is a view, in side elevation, of a relatively long portion of a catenary trolley system constructed in accordance with my invention.

Figure 1:
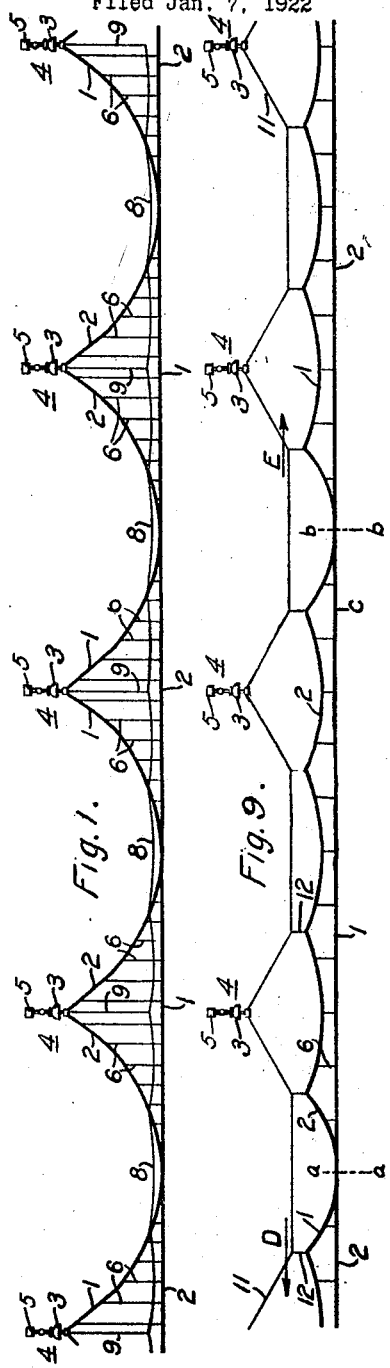
Figure 4:
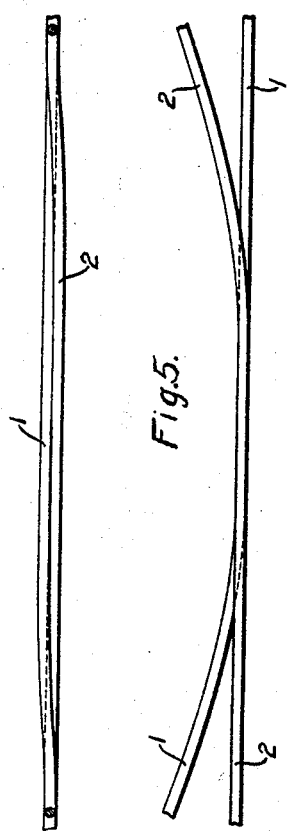
Figs. 4 and 5 are views, in plan and in side elevation, respectively, of a portion of the trolley system illustrated in Fig. 1 of the drawings.
Figure 5:
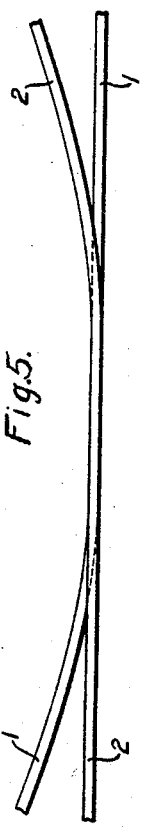

Referring particularly to Figs. 1, 4 and 5 of the drawings, a plurality of trolley conductors 1 and 2 alternately serve as messenger cables and as trolley conductors. The trolley conductors 1 and 2 are alternately secured, by means of a plurality of insulators 3, to a plurality of suitable overhead structures 4, only the cross arms 5 of which are illustrated.

The trolley conductors 1 and 2 are mechanically and electrically connected, by means of a plurality of hangers 6. The hangers 6 may be of the loop type, which provide for the small relative movement which takes place between the conductor that serves as the contact wire and the conductor that serves as the catenary wire, when the conductors are subjected to changes in either temperature or loading.

The conductors 1 and 2, being energized at the same potential, need not be separated or insulated one from the other, at points where they are at the same elevation, namely, those points where they are simultaneously engaged by the same contact device, such, for example, as a pantograph.

In addition, a messenger or supply cable 8 is suspended between the trolley conductors 1 and 2 and is mechanically connected thereto. The messenger 8 serves the double function of carrying current and increasing the weight upon the catenary wires. The cable 8 may also be suspended directly from the insulators 3 by a plurality of hangers 9.

Referring now to Fig. 8 of the drawings for a better understanding of the effect of having two trolley conductors alternately serve as the contact wire and the catenary wire, curve A represents the effect of changes of temperature upon the tension of a continuous contact wire, suspended in accordance with standard practice; curve B represents the variation in stress caused by changes in temperature in a catenary wire that serves to support a trolley wire having stresses illustrated by curve A; and curve C represents the variation in stress set up in the trolley conductors 1 and 2, which are illustrated in Fig. 1 of the drawings, by variations in temperature.

It will be noted that the stresses in the trolley conductors 1 and 2 undergo a relatively small change by comparison with a trolley conductor suspended in accordance with the usual practice and that the stresses established in the trolley conductors 1 and 2 more nearly approach the stresses set up in the catenary wire, which are represented by the curve B. In other words, the basis principle by which the temperature-compensating effect in the system illustrated by Fig. 1 of the drawings is obtained is to so suspend the contact wire thereof that the favorable temperature tension characteristics of a catenary wire in a trolley system are partially secured.

There are possibilities of improving the inherent qualities of the system by selection of suitable material for that part of the system which occupies the position of the supporting catenary wires. Any material that can develop sufficient strength may be employed as a catenary wire in a railway trolley system. In the present development of the art, economic considerations require the employment of various metals, such, for example, as bronze, copper, steel, aluminum, or some alloy of these metals in the messenger or catenary wire. With any combination of these metals in both the contact and catenary wires, a considerable reduction in the tension variation of the metal employed as the contact wire is secured by my interconnected or interchanged system. Certain combinations of metals give better results than others, but, in any case, the effects are so marked that the interconnected system may be employed indiscriminately with copper, steel, or any other metal.

Figure 2:
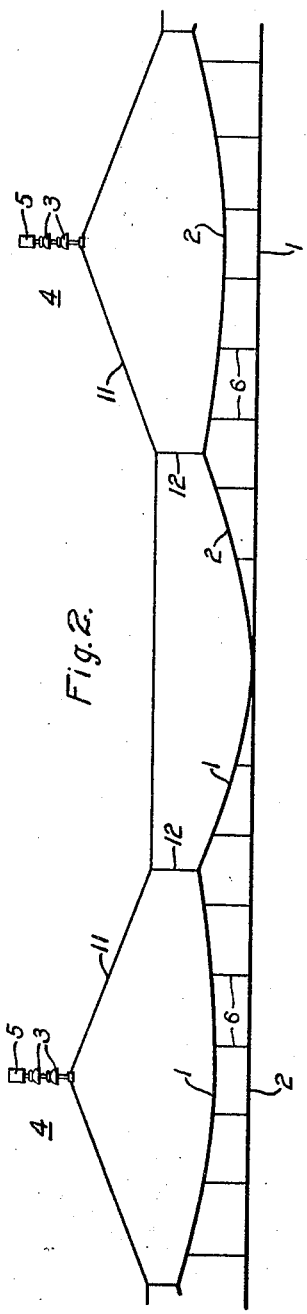

Referring to Fig. 2 of the drawings, which illustrates a heavy compound catenary system, a plurality of trolley conductors 1 and 2 alternately serve as messenger cables and as trolley wires. They are supported by a main cable 11 and a plurality of hangers 12, which are located at relatively great distances apart. In this type of construction, the main cable 11 may also carry current or it may be grounded through the supporting structure, with insulators inserted at the points of securing the messenger cable to the main cable 11.

Figure 3:
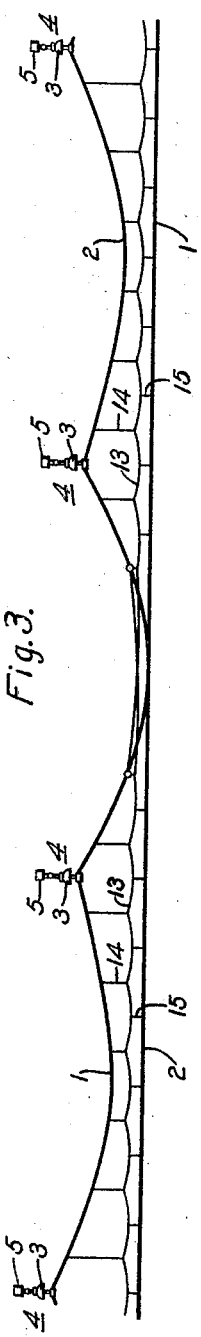

Referring to Fig. 3 of the drawings, a light compound catenary trolley system is illustrated. The catenary and trolley conductors 1 and 2 are connected together through an intermediate secondary wire or auxiliary messenger cable 13 and a plurality of hangers 14 and 15. At the center of the spans, where the trolley conductors 1 and 2 may be simultaneously engaged by the same contact device, the terminals of the messenger cables 13 are connected to the trolley conductors 1 and 2 at points where they do not serve as contact wires.

Figs. 6 and 7 of the drawings illustrate a particularly advantageous method of installing section breaks in a trolley system constructed in accordance with my invention without the employment of anchor structures and without the necessity of employing section insulators in the contact wires. The trolley system illustrated in Fig. 7 of the drawings is similar to that illustrated in Fig. 2.

The main cable 11 and trolley conductors 1 and 2 are electrically insulated from the main cable 11b and trolley conductors 1a and 2a by means of a plurality of insulators 16, none of which are positioned in the trolley conductors 1 and 2 at points where they serve as contact wires. A distance piece 17 is employed to maintain the trolley conductors 2 and 2a apart at points where the conductors may be engaged simultaneously by the same contact device.

The distance piece may consist of either a cross-span wire with direct connections through the necessary insulators to the contact wires or it may consist of pull-off-arms or other insulating devices commonly employed for keeping wires apart.

The anchoring effect obtained in any catenary system constructed in accordance with my invention will be comprehended by noting the result of a broken contact wire upon other wires of a trolley system. Considering first a simple catenary system, such, for example, as is illustrated in Fig. 1, it will be observed that, in the event of either of the contact wires 1 and 2 breaking, such wire will be secured by the insulators 3 to the supporting structures 4. The insulators 3 may be so mounted as to remain rigid, or to deflect longitudinally, thereby distributing the unbalanced pull created by a broken wire to a number of supporting structures 4.

The frequency of this anchoring is a maximum, when systems are arranged as in Fig. 1. The frequency of anchoring with other systems, such, for example, as those illustrated by Fig. 3, will depend upon the frequency of interchange between the contact and catenary wires.

In the case of compound catenary systems, such, for example, as are illustrated in Figs. 2 and 7, there is a self-anchoring effect which can be best explained by referring to Fig. 9.

Fig. 9 is a view, in side elevation, of a compound catenary system having a relatively great distance between adjacent main supporting structures 4 and the distance between the hangers 12 or points of support of the secondary or auxiliary catenary system being substantially one-half the distance between two adjacent main supporting structures. The conductors in the secondary system, marked 1 and 2, correspond to the conductors 1 and 2 in Figs. 2 and 7.

The points of interconnection or interchange between the contact and catenary wires are shown at $a$—$a$ and $b$—$b$ in Fig. 9 at a distance of two main supporting spans apart. These points may be arranged at any convenient and practicable distance and the arrangement shown is for descriptive purposes only, as, normally, they would be between 1,000 ft. and 4,000 ft. apart. Furthermore, the position of interchange between the contact and catenary wires might be directly under the supporting structure instead of midway between the supports, as shown in Fig. 9.

If we assume that the contact wire marked 1 in Fig. 9 breaks at point C, immediately unbalanced pulls in the directions of the arrows shown at D and E are set up in the system, with a resulting movement of the corresponding points in the direction of the arrows until a condition of equilibrium is reached, and the unbalanced pulls created by the breaking of the contact wire 1 at point C are taken up by the main catenary wire and eventually distributed between the main catenary wire 11 and the auxiliary catenary wire 2 in the section between points $a$—$a$ and $b$—$b$.

By this means, the unbalanced pulls created by the breaking of the contact wire are transferred to the main and auxiliary catenary wires in such a manner that they oppose each other within a given length and the system is accordingly a self-anchoring one, so far as a broken contact wire is concerned.

A broken main or auxiliary catenary wire would transfer its unbalanced pulls in a similar manner to the remaining wires without imposing practically any additional load on the main supporting structures.

To provide for this self-anchoring effect, it is merely necessary to so stress the wires under normal or working maximum conditions that they are not over-stressed by the additional or abnormal loads described above. The movement of the points D and E in Fig. 9 will depend upon the length of the section between points $a$—$a$ and $b$—$b$ and may be arranged to suit conditions and tensions in the particular system being considered.

From the above description, it is apparent that I have provided a novel overhead trolley system which has many advantageous features, particularly those of having the change in the stresses of a contact wire limited to a relatively low value and of frequently anchoring the contact wire to the supporting structures of the system.

While I have described several forms of trolley systems, it is apparent that my invention is not limited to the systems illustrated by the drawings, as these systems are capable of many modifications without departing from the spirit of my invention. I desire, therefore, to be limited only by the scope of the appended claims.

I claim as my invention:—

1. In a trolley system, the combination with a plurality of trolley conductors for supplying current to a contact device, of means for consecutively suspending one of said conductors from another in substantially the same plane whereby said conductors alternately become messenger wires, a supply conductor and means for attaching said supply conductor to said conductors at points at which said conductors function as messenger wires.

2. In a trolley system, the combination with a plurality of trolley conductors for supplying current to a contact device, of means comprising hangers for alternately suspending said conductors one from another, a supply conductor, and additional hanger means for suspending said trolley conductors from said supply conductor.

3. In a trolley system, the combination with a plurality of trolley conductors, of a main cable, means for alternately supporting one of said conductors from another, and means for suspending said conductors from said cable.

4. In a trolley system, the combination with a plurality of supports, of a main cable, a plurality of insulators for mounting said cable upon said supports, a plurality of trolley conductors for supplying current to a contact device, a plurality of hangers spaced relatively far apart for consecutively suspending said conductors from said main cable, and a plurality of hangers for suspending said conductors one from another.

5. In a trolley system, the combination with a plurality of trolley conductors for supplying current to a contact device, of means for alternately suspending said conductors one from another, and means for sectioning said conductors without employing sectional insulators where said conductors serve as contact wires.

6. In a trolley system, the combination with a plurality of trolley conductors for supplying current to a contact device, of means for alternately suspending said conductors one from another, and means comprising a plurality of insulators for sectioning said conductors, said insulators being relatively removed from points at which said trolley conductors serve as contact wires.

7. In a trolley system, the combination with a plurality of trolley conductors for supplying current to a contact device, of means for alternately suspending said conductors one from another, a plurality of insulators for sectioning said conductors, said insulators being relatively removed from points at which said trolley conductors serve as contact wires, and means for maintaining said conductors separated at a point where both might simultaneously serve as contact wires.

8. In a trolley system, the combination with a main cable and means for supporting said main cable, of means for insulating different portions of said main cable, a plurality of trolley conductors employed jointly to supply current to a contact device, means for alternately supporting one conductor by another, a plurality of insulators for sectioning said conductors, said insulators being relatively removed from points where said conductors serve as contact wires, means for preventing said trolley conductors from engaging one another and means for suspending portions of said conductors that serve as contact wires directly from portions of said main cable.

9. An electrical system of the character set forth comprising a main feeder wire and a plurality of contact wires connected to said feeder wire, said contact wires being arranged in a series of overlapping loops, parts of which directly contact with each other.

10. An electrical system of the character set forth comprising a main feeder wire and a plurality of contact wires suspended from said feeder wire, each of said contact wires being suspended independently at a plurality of points from said feeder wire to provide a series of overlapping loops.

In testimony whereof, I have hereunto subscribed my name this 5th day of January, 1922.

PATRICK A. McGEE.